(12) United States Patent
McDonald

(10) Patent No.: US 8,788,182 B2
(45) Date of Patent: Jul. 22, 2014

(54) ENGINE SPEED BASED VALVETRAIN CONTROL SYSTEMS AND METHODS

(75) Inventor: Mike M. McDonald, Macomb, MI (US)

(73) Assignee: GM Global Technology Operations LLC

( * ) Notice: Subject to any disclaimer, the term of this patent is extended or adjusted under 35 U.S.C. 154(b) by 264 days.

(21) Appl. No.: 13/226,759

(22) Filed: Sep. 7, 2011

(65) Prior Publication Data

US 2013/0060453 A1 Mar. 7, 2013

(51) Int. Cl.
- F02D 41/12 (2006.01)
- F02D 13/04 (2006.01)
- F02D 25/04 (2006.01)

(52) U.S. Cl.
USPC ........... 701/110; 701/112; 123/436; 123/481; 123/198 F; 123/198 DB; 123/332; 123/351

(58) Field of Classification Search
USPC ............... 701/103, 110, 112, 113; 123/90.15, 123/481, 198 DB, 198 F, 320, 325, 332, 333, 123/350, 351
See application file for complete search history.

(56) References Cited

U.S. PATENT DOCUMENTS

| | | |
|---|---|---|
| 3,964,263 A | 6/1976 | Tibbs |
| 4,641,613 A | 2/1987 | Delesalle |
| 4,805,571 A | 2/1989 | Humphrey |
| 4,892,067 A | 1/1990 | Paul et al. |
| 4,930,465 A | 6/1990 | Wakeman et al. |
| 4,960,083 A | 10/1990 | Seki et al. |
| 5,107,432 A | 4/1992 | Martinelli ...................... 701/112 |
| 5,154,143 A | 10/1992 | Stutzenberger |
| 5,588,402 A | 12/1996 | Lawrence |
| 5,680,841 A | 10/1997 | Hu |
| 5,732,677 A | 3/1998 | Baca |
| 5,787,705 A | 8/1998 | Thoreson |
| 6,443,108 B1 | 9/2002 | Brehob et al. |
| 6,904,752 B2 | 6/2005 | Foster et al. ..................... 60/295 |
| 6,918,358 B2 | 7/2005 | Hu |
| 6,922,986 B2 | 8/2005 | Rozario |
| 6,968,825 B2 | 11/2005 | Hitomi et al. |
| 7,079,941 B2 | 7/2006 | Tetsuno et al. |
| 7,103,468 B2 | 9/2006 | Wakashiro et al. ........... 701/110 |
| 7,146,966 B2 * | 12/2006 | Nakamura ..................... 123/481 |
| 7,258,101 B1 | 8/2007 | McDonald |
| 7,380,535 B2 * | 6/2008 | Hartmann et al. ......... 123/198 F |
| 7,624,709 B2 | 12/2009 | Cao |
| 7,757,657 B2 * | 7/2010 | Albertson et al. ......... 123/198 F |
| 7,913,669 B2 | 3/2011 | Luken et al. ................... 123/481 |
| 7,918,205 B2 * | 4/2011 | Wermuth et al. ............. 123/295 |
| 8,011,331 B2 | 9/2011 | Albertson et al. |
| 8,079,335 B2 * | 12/2011 | Rollinger et al. .......... 123/90.17 |

(Continued)

OTHER PUBLICATIONS

U.S. Appl. No. 13/028,552, filed Feb. 16, 2011, McDonald et al.

(Continued)

*Primary Examiner* — Hai Huynh

(57) ABSTRACT

A system for a vehicle includes a trigger module, a fuel control module, and a cylinder control module. The trigger module generates a trigger when an engine speed is greater than a first predetermined speed. The first predetermined speed is greater than zero. The fuel control module cuts off fuel to cylinders of the engine in response to the generation of the trigger. The cylinder control module selectively disables opening of intake and exhaust valves of the cylinders in response to the generation of the trigger after the fuel is cut off.

20 Claims, 7 Drawing Sheets

(56) References Cited

U.S. PATENT DOCUMENTS

| | | |
|---|---|---|
| 8,191,516 B2 | 6/2012 | Moon et al. |
| 8,360,036 B2 * | 1/2013 | Riegger et al. ............ 123/568.14 |
| 8,424,289 B2 | 4/2013 | Narayanaswamy et al. .... 60/285 |
| 8,443,588 B2 * | 5/2013 | Nishikiori et al. ............... 60/285 |
| 2002/0083904 A1 | 7/2002 | Otterspeer et al. |
| 2004/0173166 A1 | 9/2004 | Kobayashi et al. |
| 2004/0206071 A1 | 10/2004 | Glugla et al. ................... 60/285 |
| 2005/0210868 A1 | 9/2005 | Funabashi ...................... 60/277 |
| 2007/0113542 A1 | 5/2007 | Lewis |
| 2008/0319594 A1 | 12/2008 | Shibata et al. .................. 701/22 |
| 2010/0064992 A1 | 3/2010 | Albertson et al. |
| 2010/0224151 A1 | 9/2010 | Moon et al. |
| 2011/0106406 A1 * | 5/2011 | Moriya ......................... 701/103 |
| 2011/0139117 A1 | 6/2011 | Kar et al. ...................... 123/395 |
| 2011/0144888 A1 | 6/2011 | Rollinger et al. ............. 701/103 |
| 2011/0265456 A1 | 11/2011 | Fiveland et al. ................. 60/285 |
| 2012/0204545 A1 | 8/2012 | Mc Donald et al. |
| 2013/0055972 A1 | 3/2013 | Mc Donald et al. |

OTHER PUBLICATIONS

U.S. Appl. No. 13/226,790, filed Sep. 7, 2011, McDonald et al.
Carburetor vs. Fuel Injection: Understanding the Pros and Cons, CarsDirect.com, Aug. 16, 2010.

* cited by examiner

ENGINE SPEED BASED VALVETRAIN CONTROL SYSTEMS AND METHODS

CROSS-REFERENCE TO RELATED APPLICATIONS

This application is related to U.S. patent application Ser. No. 13/226,790 filed on Sep. 7, 2011. The disclosure of the above application is incorporated herein by reference in its entirety.

FIELD

The present disclosure relates to engine control systems and methods and more particularly to valvetrain control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve may control airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The ECM may modify how and when fuel and spark are provided to the cylinders.

SUMMARY

A system for a vehicle includes a triggering module and a cylinder control module. The triggering module generates a trigger when a catalyst temperature is greater than a predetermined temperature. In response to the generation of the trigger, the cylinder control module: disables opening of an exhaust valve of a cylinder for an exhaust phase of a first combustion cycle of the cylinder; disables opening of the exhaust valve for N combustion cycles of the cylinder that follow the first combustion cycle; and enables opening of the exhaust valve for a second combustion cycle that follows the N combustion cycles. N is an integer greater than zero.

A method for a vehicle includes generating a trigger when a catalyst temperature is greater than a predetermined temperature and, in response to the generation of the trigger: disabling opening of an exhaust valve of a cylinder for an exhaust phase of a first combustion cycle of the cylinder; disabling opening of the exhaust valve for N combustion cycles of the cylinder that follow the first combustion cycle; and enabling opening of the exhaust valve for a second combustion cycle that follows the N combustion cycles, wherein N is an integer greater than zero.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
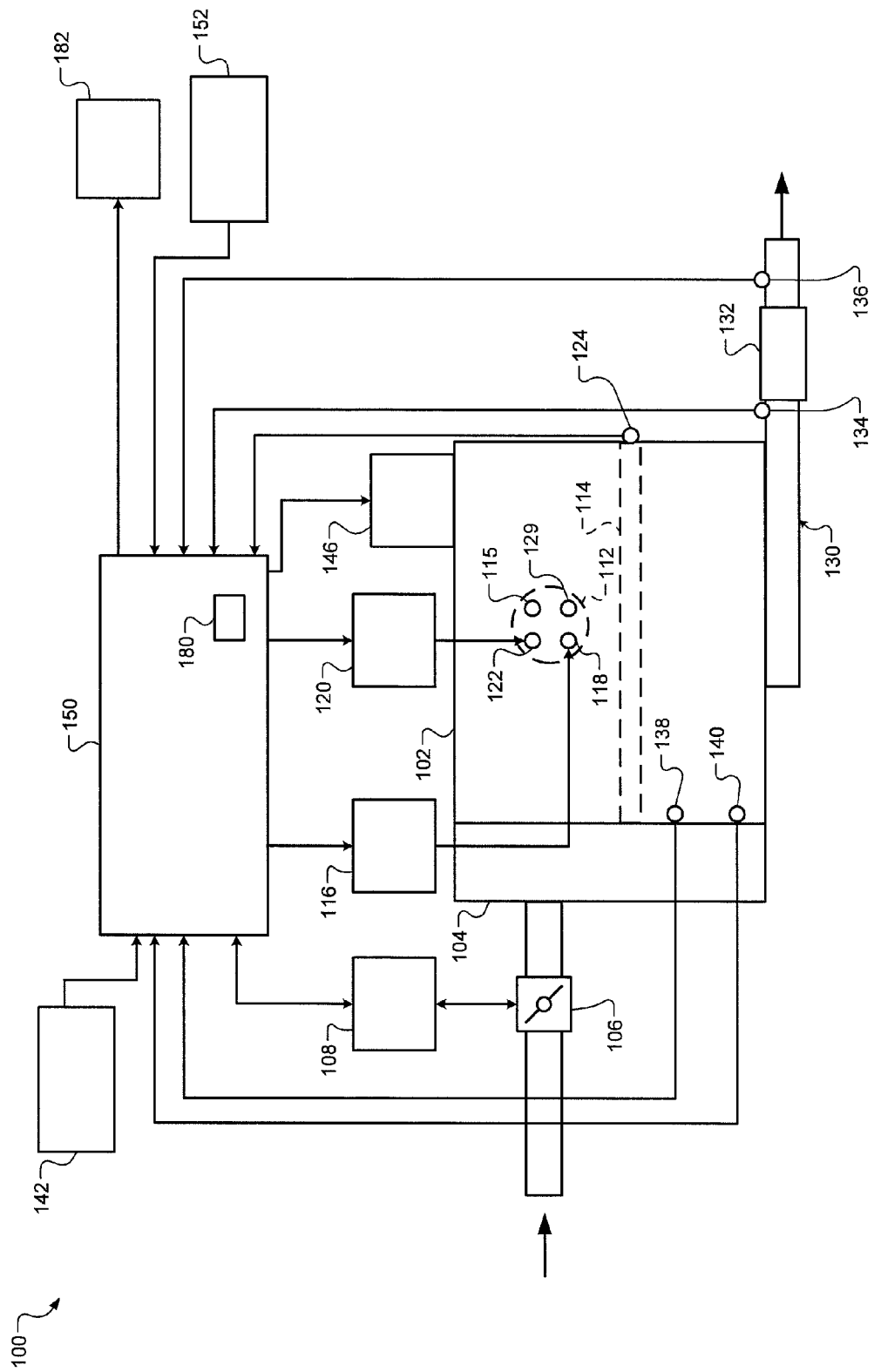
FIG. 1 is a functional block diagram of an example engine and exhaust system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control module (ECM) controls provision of fuel and spark to cylinders of an engine. More specifically, the ECM controls how much fuel is supplied to a given cylinder, when the fuel is supplied to the cylinder, and when a spark is generated to initiate combustion within the cylinder. The ECM also controls actuation of intake and exhaust valves of the engine.

Combustion within the engine produces torque that may be used to propel a vehicle. Combustion also produces exhaust. Exhaust is output to an exhaust system. The exhaust system includes a catalyst that treats the exhaust.

The ECM monitors a rotational speed of the engine (engine speed) and a temperature of the catalyst (catalyst temperature). When the catalyst temperature is greater than a predetermined temperature, ECMs may generally provide a rich air/fuel mixture to the engine (e.g., approximately 10:1 for gasoline) to cool the catalyst.

The ECM of the present disclosure deactivates one or more cylinders of the engine when the catalyst temperature is greater than the predetermined temperature. When a cylinder is deactivated, intake and exhaust valves of the cylinder are maintained in closed positions. Fuel and spark to a cylinder may be cut off when the cylinder is deactivated.

When the catalyst temperature is greater than the predetermined temperature, the ECM deactivates the one or more cylinders to trap a burnt mixture of air and fuel (a burnt charge) within each of the cylinder(s). Trapping the burnt charges allows heat to be transferred away from the burnt charges to engine components and engine fluids (e.g., coolant, oil, etc.).

When the cylinders are re-activated, the burnt charges are expelled from the cylinders to the exhaust system and the catalyst. The temperatures of the burnt charges, however, are less than they would have been had the cylinders not been deactivated. The cooler burnt charges may help decrease the catalyst temperature and/or help prevent the catalyst temperature from increasing further.

When the engine speed is greater than a first predetermined speed (e.g., 7000 rpm), the ECM cuts off fuel and spark to the engine. After fuel to the engine has been cut off, the ECM deactivates the cylinders of the engine to trap air (a fresh air charge) within each of the cylinders. Cutting off fuel, spark, and deactivating the cylinders allows the engine speed to slow. The ECM continues to monitor the engine speed and selectively re-activates the cylinders one at a time when the engine speed is less than a second predetermined speed (e.g., 6500 rpm).

Referring now to FIG. 1, a functional block diagram of an example engine system 100 is presented. The engine system 100 includes an engine 102 that combusts an air/fuel mixture to produce drive torque. While the engine 102 is shown and will be discussed as being a gasoline engine, the engine 102 may be another suitable type of engine, such as a diesel engine, a flex-fuel engine, etc. One or more electric motors may be provided with the engine 102.

Air may be drawn into an intake manifold 104 through a throttle valve 106. A throttle actuator module 108 may control opening of the throttle valve 106. Air from the intake manifold 104 is drawn into cylinders of the engine 102. While the engine 102 may include more than one cylinder, for illustration purposes only, only cylinder 112 is shown.

The engine 102 may operate using a four-stroke cylinder cycle for example. The four strokes, described below, may be referred to as the intake stroke, the compression stroke, the combustion (or expansion) stroke, and the exhaust stroke. During each revolution of a crankshaft 114, two of the four strokes occur within the cylinder 112. Therefore, two crankshaft revolutions are necessary for the cylinder 112 to experience all four of the strokes of one combustion cycle. The cylinders of the engine 102 are generally fired in a predetermined firing order.

During the intake stroke, air from the intake manifold 104 is drawn into the cylinder 112 via one or more intake valves, such as intake valve 115. A fuel actuator module 116 controls opening of a fuel injector 118 associated with the cylinder 112. The injected fuel mixes with air and creates an air/fuel mixture. During the compression stroke, a piston (not shown) compresses the air/fuel mixture within the cylinder 112.

A spark actuator module 120 energizes a spark plug 122 associated with the cylinder 112, and spark generated by the spark plug 122 ignites the air/fuel mixture. The timing of the spark may be specified relative to the time when the piston is at its topmost position, referred to as top dead center (TDC). Because piston position is directly related to crankshaft rotation, the spark timing may be synchronized with crankshaft position.

A crankshaft position sensor 124 monitors rotation of the crankshaft 114 and generates a crankshaft position signal based on the position of the crankshaft 114. The crankshaft position sensor 124 may include a variable reluctance (VR) sensor or another suitable type of crankshaft position sensor. The crankshaft position signal may include a pulse train.

Each pulse of the pulse train may be generated as a tooth of an N-toothed wheel (not shown) passes the crankshaft position sensor 124. The N-toothed wheel is attached to and rotates with the crankshaft 114. Accordingly, each pulse may correspond to an angular rotation of the crankshaft 114 by an amount equal to 360° divided by N teeth. The N-toothed wheel may also include a gap of one or more missing teeth. An engine speed in revolutions per minute (RPM) may be determined based on the crankshaft position (e.g., see FIG. 2).

During the combustion stroke, which may also be referred to as the expansion stroke, the air/fuel mixture is combusted within the cylinder 112. Heat of combustion of the air/fuel mixture increases pressure within the cylinder 112 and drives the piston away from the TDC position, thereby driving rotation of the crankshaft 114. One or more exhaust valves, such as exhaust valve 129, may be opened near when the piston reaches a bottom most position. As the piston moves back toward the TDC position, the piston works to expel the byproducts of combustion (a burnt charge) from the cylinder 112 via the one or more exhaust valves. One combustion cycle of the cylinder 112 may be defined by the period necessary to complete the four-strokes (720° of crankshaft rotation in the four-stroke engines).

The exhaust may be expelled from the cylinder 112 to an exhaust system 130. A catalyst 132 receives the exhaust gas output by the engine 102 and reacts with various components of the exhaust. For example only, the catalyst 132 may include a three-way catalyst (TWC), a catalytic converter, or another suitable exhaust catalyst.

One or more exhaust temperature sensors may be located throughout the exhaust system 130. For example only, a first catalyst temperature sensor 134 may measure the temperature of exhaust upstream of the catalyst 132. A second catalyst temperature sensor 136 may measure the temperature of exhaust downstream of the catalyst 132. The first and second catalyst temperature sensors 134 and 136 generate first and second exhaust temperature signals based on the temperatures upstream and downstream of the catalyst 132, respectively. One or more measured exhaust temperatures and/or one or more other measured parameters may be used to estimate a temperature of the catalyst 132 (e.g., see FIG. 2). In various implementations, the temperature of the catalyst 132 may be measured directly.

An oil temperature sensor 138 measures temperature of oil of the engine 102. The oil temperature sensor 138 generates an oil temperature signal based on the temperature of the oil. An oil pressure sensor 140 measures pressure of the oil and generates an oil pressure signal based on the pressure of the oil. A vehicle may also include one or more other sensors 142, such as an engine coolant temperature sensor, a manifold absolute pressure (MAP) sensor, a mass air flow (MAF) sensor, a throttle position sensor, an intake air temperature (IAT) sensor, and/or other suitable sensors.

A valve actuator module 146 controls opening and closing of the intake and exhaust valves of the engine 102. More specifically, the valve actuator module 146 provides the ability to perform variable valve actuation (VVA) and cylinder deactivation. The valve actuator module 146 may selectively activate and de-activate opening of the valves (intake and/or exhaust) of one or more cylinders using oil that is pumped by a crankshaft driven oil pump (not shown). In various other implementations, the valve actuator module 146 may provide what may be referred to as fully flexible valve actuation (FFVA) and operate using oil pumped using, for example, an electric pump (not shown). FFVA systems may use direct electrical actuation, mechanical actuation, or another suitable type of actuation as opposed to locking pins.

The valve actuator module 146 may deactivate opening of a given valve such that the valve remains in its closed position when it would otherwise be in an open position by moving a locking pin (not shown) that is associated with the valve. The valve actuator module 146 may later re-activate opening of a given valve such that the valve is opened by a lobe of a camshaft by re-inserting the locking pin. In various implementations, the valve actuator module 146 may also control a distance that each given valve is opened (referred to as lift) and a period that each given valve is in an open position (referred to as duration).

An engine control module (ECM) 150 controls the fuel injector 118 via the fuel actuator module 116. More specifically, the ECM 150 controls the amount of fuel injected into the cylinder 112 and when the fuel is injected. The ECM 150 controls the spark plug 122 via the spark actuator module 120. More specifically, the ECM 150 may control spark timing via the spark actuator module 120. The ECM 150 controls engine valve opening lift and timing via the valve actuator module 146.

The ECM 150 may control fuel injection, spark timing, cylinder deactivation, and other actuator values to control torque output by the engine 102. The ECM 150 may regulate the torque output of the engine 102 based on driver inputs provided by a driver input module 152 and inputs from one or more torque requestors. The ECM 150 may also selectively control fuel injection, spark timing, cylinder deactivation, and other actuator values based on the occurrence of various types of events.

The ECM 150 of the present disclosure includes a protection module 180 that selectively controls fuel injection, spark timing, and/or cylinder deactivation to protect various vehicle components from being damaged. The protection module 180 may additionally or alternatively take one or more other actions, such as illuminating an indicator lamp (e.g., a malfunction indicator lamp or MIL) 182.

For example only (e.g., see FIG. 2), the protection module 180 deactivates one or more cylinders such that a burnt charge is trapped within each of the one or more cylinders when the catalyst temperature is greater than a predetermined temperature. The catalyst 132 may be damaged when the catalyst temperature is greater than the predetermined temperature.

The protection module 180 deactivates the one or more cylinders for a predetermined number of combustion cycles. Trapping burnt charges within the cylinders for at least one combustion cycle cools the burnt charges. Trapping the burnt charges for at least one combustion cycle may help cool the catalyst 132 and/or prevent the catalyst temperature from increasing further. The amount of cooling associated with trapping the burnt charges may increase as the engine speed decreases because the trapped charges reside in the cylinders for a longer period and can transfer more heat to engine components.

For another example only (e.g., see FIG. 5), when the engine speed is greater than a predetermined speed, the protection module 180 cuts off fuel to all of the cylinders of the engine 102. After the fuel is cut off, the protection module 180 deactivates all of the cylinders such that a fresh air charge is trapped within each of the cylinders. Cutting off fuel and trapping fresh air within each of the cylinders may allow the engine speed to slow.

While the protection module 180 is shown and discussed as being located within the ECM 150, the protection module 180 may be located in another suitable location. For example only, the protection module 180 may be located external to the ECM 150 or in another suitable module.

Figure 2:
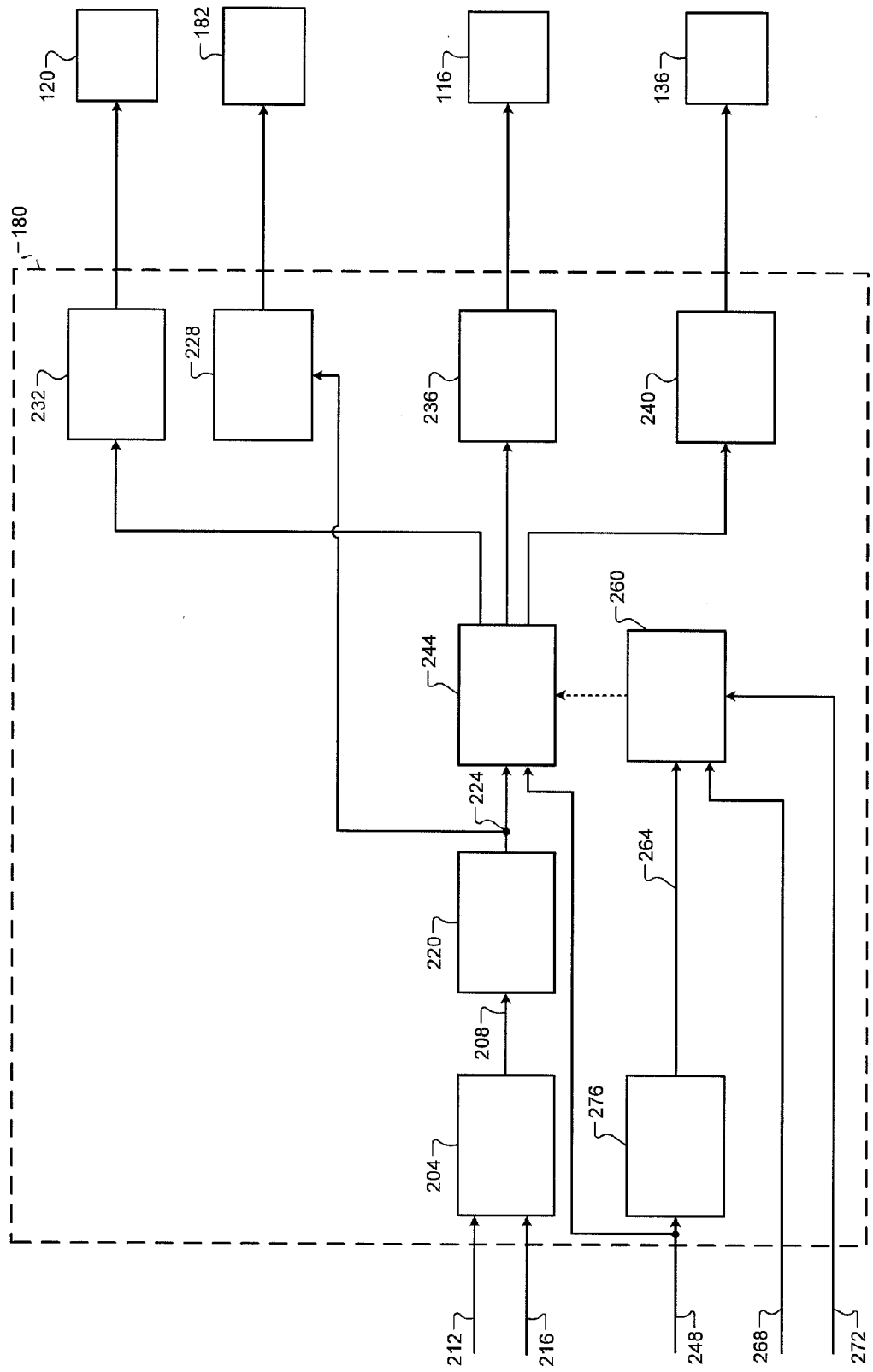
FIG. 2 is a functional block diagram of an example implementation of a protection module according to the principles of the present disclosure.

Referring now to FIG. 2, a functional block diagram of an example implementation of the protection module 180 is presented. A catalyst temperature determination module 204 generates a catalyst temperature 208. For example only, the catalyst temperature determination module 204 may estimate the catalyst temperature 208 based on the upstream exhaust temperature 212, the downstream exhaust temperature 216, and/or one or more other parameters. The upstream exhaust temperature 212 may be provided based on the temperature measured by the first catalyst temperature sensor 134. The downstream exhaust temperature 216 may be provided based on the temperature measured by the second catalyst temperature sensor 136.

A triggering module 220 selectively generates a catalyst temperature trigger (e.g., signal) 224 based on the catalyst temperature 208. More specifically, the triggering module 220 generates the catalyst temperature trigger 224 when the catalyst temperature 208 is greater than a predetermined temperature. For example only, the predetermined temperature may be approximately 875 degrees Celsius (° C.) or another suitable temperature.

The triggering module 220 may, for example, set the catalyst temperature trigger 224 to an active state when the catalyst temperature 208 is greater than the predetermined temperature. Written conversely, the triggering module 220 may set the catalyst temperature trigger 224 to an inactive state when the catalyst temperature 208 is not greater than the predetermined temperature. A lamp control module 228 may illuminate the indicator lamp 182 when the catalyst trigger 224 is generated (e.g., is in the active state).

A spark control module 232 controls the spark actuator module 120. A fuel control module 236 controls the fuel actuator module 116. A valve control module 240 controls the valve actuator module 146. A cylinder control module 244 selectively generates commands for the spark control module 232, the fuel control module 236, and/or the valve control module 240.

For example, the cylinder control module 244 may command the valve control module 240 to deactivate the intake and exhaust valves of one or more cylinders when the catalyst temperature trigger 224 is generated. For example only, the cylinder control module 244 may command the valve control module 240 to deactivate half of the cylinders of the engine 102. The cylinder control module 244 deactivates one or more cylinders based on the command from the cylinder control module 244.

The cylinder control module 244 may specify which one or more cylinders the valve control module 240 should deactivate. The cylinder control module 244 may specify which one or more cylinders to deactivate, for example, to minimize noise, vibration, and harshness attributable to the deactivation of the one or more cylinders.

The cylinder control module 244 commands the valve control module 240 to deactivate the one or more cylinders such that a burnt charge is trapped within each of the one or more cylinders. In terms of one cylinder, the cylinder control module 244 may command the valve control module 240 to deactivate the one cylinder after the intake valve(s) of the one cylinder begins to open and before the exhaust valve(s) of the one cylinder would begin to open. The cylinder control module 244 may command the valve control module 240 to perform similarly for each of the one or more cylinders that are to be deactivated.

The cylinder control module 244 may command the fuel control module 236 to cut off fuel to the one or more cylinders when the one or more cylinders are deactivated. The cylinder control module may command the spark control module 232 to disable spark to the one or more cylinders when the one or more cylinders are deactivated.

The cylinder control module 244 may command the fuel control module 236 to provide fuel to the non-deactivated cylinders to create approximately a predetermined air/fuel mixture. The predetermined air/fuel mixture may be expressed in terms of equivalence ratio (lambda). For example only, the predetermined air/fuel mixture may be between approximately 13:1 and 14.7:1 (stoichiometry), between approximately 14:1 and 14.7:1, or another suitable value for a gasoline engine system. In terms of equivalence ratio, the cylinder control module 244 may command the fuel control module 236 to provide fuel to the non-deactivated cylinders to create an equivalence ratio of between approximately 0.88 and 1.0, between approximately 0.95 and 1.0, or another suitable value. An air/fuel mixture that is slightly rich may further aid cooling of the catalyst temperature.

The cylinder control module 244 commands the valve control module 240 to deactivate the one or more cylinders for a predetermined period. The predetermined period may be expressed in terms of a predetermined number of combustion cycles or a predetermined number of degrees of crankshaft rotation. For example only, the predetermined number of combustion cycles may be one combustion cycle (e.g., 720° of crankshaft rotation), two combustion cycles (1440° of crankshaft rotation), or another suitable number of combustion cycles. The cylinder control module 244 may also command the spark control module 232 and the fuel control module 236 to disable spark and fuel, respectively, to the one or more cylinders for the predetermined period.

Figure 3:
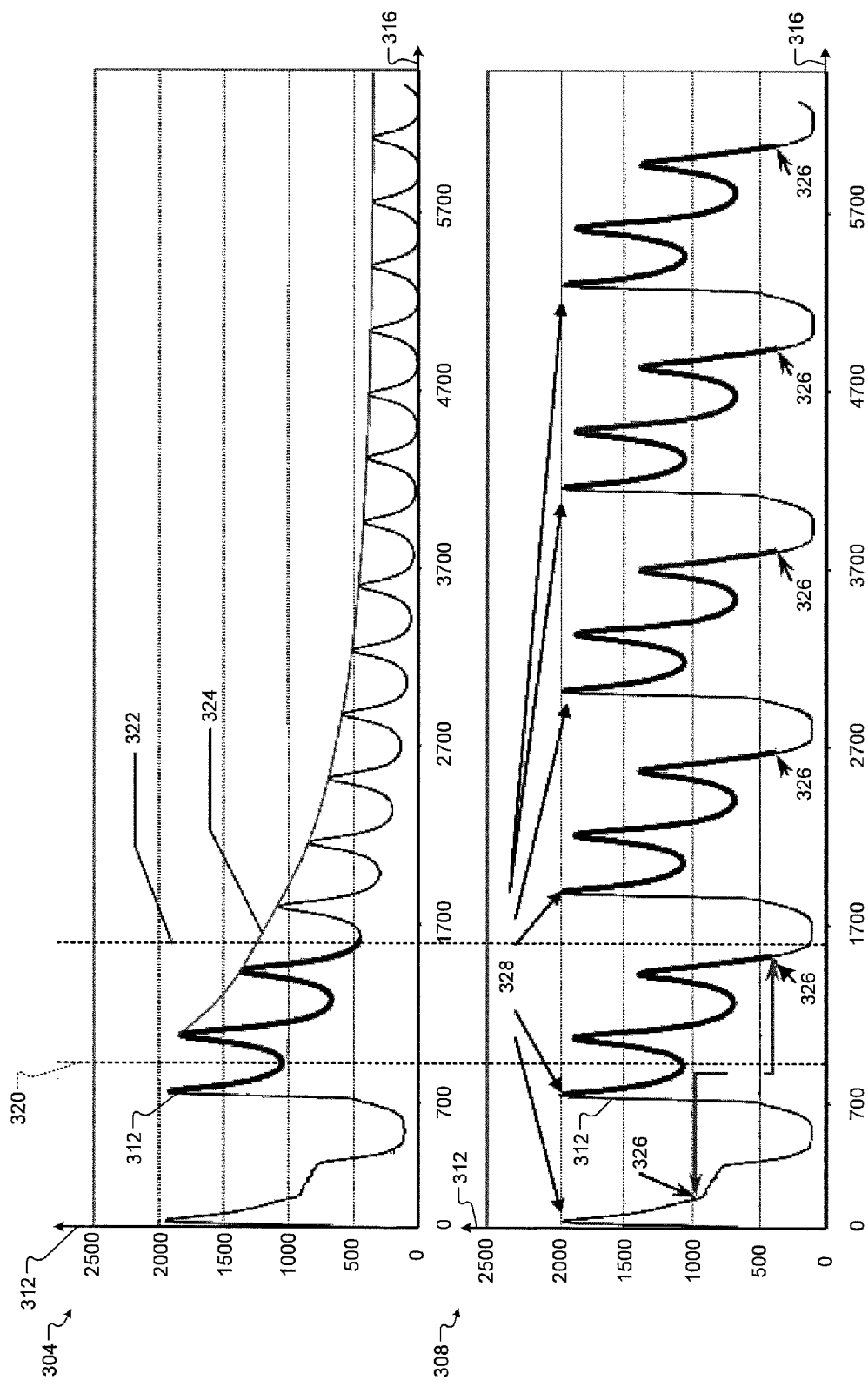
FIG. 3 includes example graphs of temperature versus crankshaft angle.

Trapping the burnt charges within each of the one or more cylinders allows the burnt charges to transfer heat to engine components and engine fluids. FIG. 3 includes first and second example illustrations 304 and 308 of cylinder gas temperature 312 versus crankshaft angle 316.

In the example illustration 304, the intake and exhaust valves of a cylinder are deactivated at approximately crank angle 320 such that a burnt charge is trapped within the cylinder. The cylinder is deactivated for the remainder of the example illustration 304. One combustion cycle may be defined between time 320 and time 322. As shown, the temperature 312 decreases as heat is transferred away from the burnt charge. In other words, the temperature 312 generally decreases as the period that the burnt charge is trapped increases. Example trace 324 tracks peaks in the temperature 312 after the deactivation of the cylinder. The temperature 312 increases and decreases after the deactivation as the piston compresses and expands the burnt charge, respectively.

In the example illustration 308, the intake and exhaust valves of the cylinder are deactivated at approximately the crank angle 320. The cylinder is deactivated for one combustion cycle of the cylinder before the cylinder is re-activated. In other words, the burnt charge is expelled from the cylinder one combustion cycle after it would have otherwise been expelled from the cylinder. Accordingly, the burnt charge is cooler than it otherwise would have been had the cylinder not been deactivated. Exhaust valve openings are indicated by 326. Combustion events are indicated by 328.

Referring back to FIG. 2, the cylinder control module 244 monitors the crankshaft position 248 and selectively re-activates the one or more (deactivated) cylinders when the predetermined period (e.g., amount of crankshaft rotation) has passed. More specifically, the cylinder control module 244 may command the valve control module 240 to re-activate opening of the intake and exhaust valves when the predetermined period has passed. The valve control module 240 selectively re-activates the one or more cylinders such that the exhaust valves open first to expel the burnt charges from the one or more cylinders. The cylinder control module 244 may also command the spark control module 232 and the fuel control module 236 to provide fuel and spark to each of the previously deactivated cylinders for the cylinders combustion cycles, respectively.

An enabling module 260 may selectively enable and disable the cylinder control module 244. Enabling and disabling the cylinder control module 244 may allow and prevent, respectively, the cylinder control module 244 from deactivating the one or more cylinders when the catalyst temperature trigger 224 is generated.

The enabling module 260 may enable and disable the cylinder control module 244 based on whether the valve actuator module 146 is operational. For example only, in implementations including a crankshaft driven oil pump, the enabling module 260 may disable the cylinder control module 244 when the engine speed 264 is greater than a predetermined speed. Additionally or alternatively, the enabling module 260 may disable the cylinder control module 244 when the oil temperature 268 is less than a second predetermined temperature. Additionally or alternatively, the enabling module 260 may disable the cylinder control module 244 when the oil pressure 272 is less than a predetermined pressure.

Written conversely, the enabling module 260 may enable the cylinder control module 244 when the engine speed is less than the predetermined speed, the oil temperature 268 is greater than the second predetermined temperature, and the oil pressure 272 is greater than the predetermined pressure. For example only, the predetermined speed may be approximately 3000 RPM, the second predetermined temperature may be approximately 0° C., and the predetermined pressure may be approximately 15 pounds per square inch (psi). An engine speed determination module 276 may determine the engine speed 264 based on the crankshaft position 248.

Figure 4:
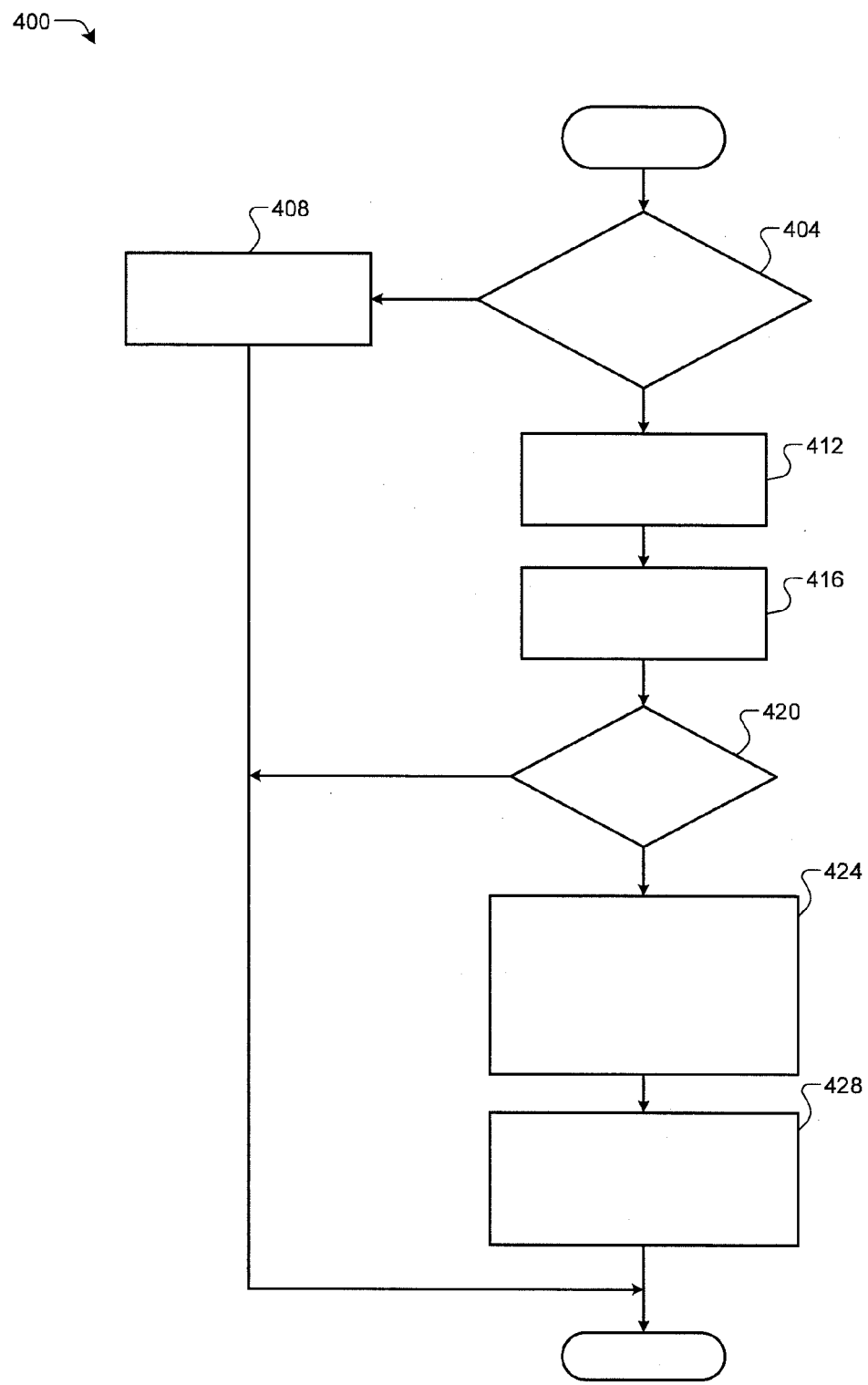
FIG. 4 is a flowchart of an example method of controlling valve actuation based on catalyst temperature according to the principles of the present disclosure.

Referring now to FIG. 4, a flowchart depicting an example method 400 of controlling valve actuation based on the catalyst temperature 208 is presented. At 404, control determines whether the catalyst temperature 208 is greater than the predetermined temperature. If false, control may set the catalyst temperature trigger 224 to the inactive state at 408 and end. If true, control may set the catalyst temperature trigger 224 to the active state (i.e., generate the catalyst temperature trigger 224) at 412 and continue with 416. For example only, the predetermined temperature may be approximately 875° C. or another suitable temperature above which the catalyst 132 may incur damage. The indicator lamp 182 may be illuminated when the catalyst temperature trigger 224 is in the active state.

At 416, control may set a commanded equivalence ratio (EQR) for the cylinders. The commanded EQR may be set for both cylinders that are to be deactivated and cylinders that are to remain activated. For example only, control may command that fuel be provided to cylinders to achieve the predetermined air/fuel mixture or equivalence ratio.

At 420, control may determine whether one or more enabling conditions are satisfied. For example only, control may determine whether the engine speed 264 is less than the predetermined speed, the oil temperature 268 is less than the predetermined temperature, and the oil pressure 272 is less than the predetermined pressure. If true, control may continue with 424; if false, control may avoid deactivating the one or more cylinders and end.

Control may deactivate (the intake and exhaust valves of) the one or more cylinders such that a burnt charge is trapped within each of the one or more cylinders at 424. Control may determine the number of cylinders to deactivate, for example, based on the catalyst temperature 208. For example only, control may increase the number as the catalyst temperature 208 increases.

Control deactivates the one or more cylinders for the predetermined period (e.g., a predetermined number of combustion cycles or rotational degrees of the crankshaft) at 424. For example only, control may deactivate the one or more cylinders for one combustion cycle (e.g., 720° of crankshaft rotation), two combustion cycles (e.g., 1440° of crankshaft rotation), or another suitable period. Trapping and retaining the burnt charges within the one or more cylinders for at least one combustion cycle cools the burnt charges by transferring heat from the burnt charges to engine components and engine fluids.

At 428, after the predetermined period has passed, control selectively re-activates the one or more cylinders such that the burnt charges are output. In this manner, the (now cooler) burnt charges are output to the exhaust system 130. The cooler burnt charges may help cool the catalyst 132 and/or aid in preventing the catalyst temperature 208 from increasing further. Cooling the catalyst 132 using selective cylinder deactivation may provide a fuel consumption savings relative to catalyst cooling systems that cool the catalyst 132 by providing a predetermined rich air/fuel mixture (e.g., approximately 10:1 for a gasoline engine). While control is shown and described as ending, the example of FIG. 4 is illustrative of one control loop and control may return to 404.

Figure 5:
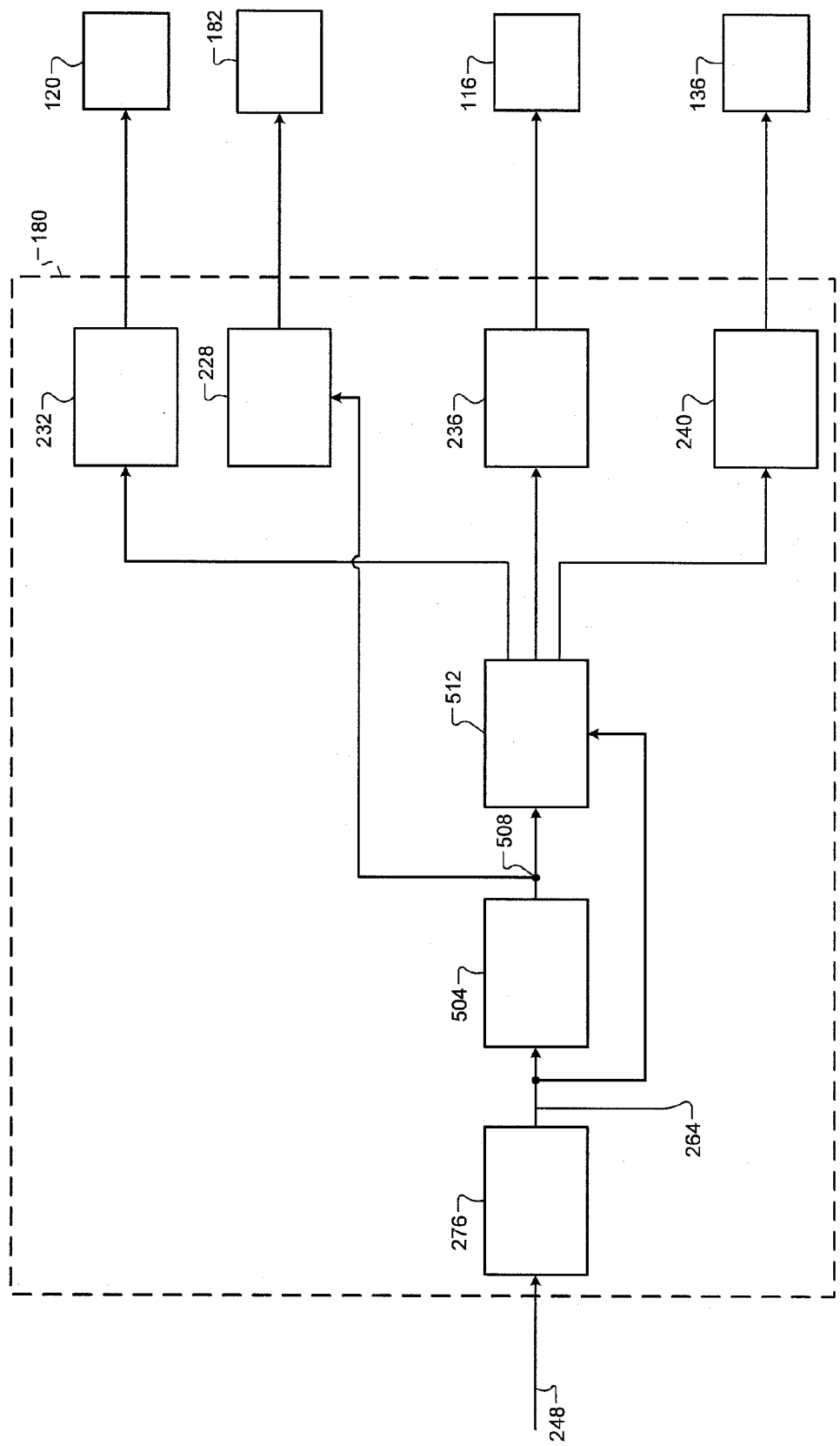
FIG. 5 is a functional block diagram of another example implementation of the protection module according to the principles of the present disclosure.

Referring now to FIG. 5, another functional block diagram of the protection module 180 is presented. A second triggering module 504 receives the engine speed 264. The second triggering module 504 selectively generates an engine speed trigger (e.g., signal) 508 based on the engine speed 264. More specifically, the triggering module 220 generates the engine speed trigger 508 when the engine speed 264 is greater than a first predetermined speed. For example only, the first predetermined speed may be approximately 7000 RPM or another suitable speed.

The second triggering module 504 may, for example, set the engine speed trigger 508 to an active state when the engine speed 264 is greater than the first predetermined speed. Written conversely, the second triggering module 504 may set the engine speed trigger 508 to an inactive state when the engine speed 264 is not greater than the first predetermined speed. The lamp control module 228 may illuminate the indicator lamp 182 when the engine speed trigger 508 is generated (e.g., in the active state). One or more engine components can be damaged when the engine speed 264 is greater than the first predetermined speed. For example only, the examples of engine components that can be damaged may include a valve, a flex plate, a rod bearing, and/or one or more other engine components.

A cylinder control module 512 selectively generates commands for the spark control module 232, the fuel control module 236, and/or the valve control module 240. For example, the cylinder control module 512 commands the fuel control module 236 to cut off fuel to all of the cylinders of the engine 102 when the engine speed trigger 508 is generated. The cylinder control module 512 may also command the spark control module 232 to cut off spark to all of the cylinders of the engine 102 when the engine speed trigger 508 is generated.

The cylinder control module 512 commands the valve control module 240 to deactivate all of the cylinders of the engine 102 when the engine speed trigger 508 is generated and fuel has been cut off. More specifically, the cylinder control module 512 commands the valve control module 240 to deactivate all of the cylinders such that a fresh air charge (without fuel) is trapped within each of the cylinders.

Once a fresh air charge has been trapped within each of the cylinders for a second predetermined period, the cylinder control module 512 may begin monitoring the engine speed 264. The second predetermined period may be expressed in terms of a predetermined amount of crankshaft rotation or a predetermined number of combustion cycles. For example only, the second predetermined period may be one combustion cycle (e.g., 720° of crankshaft rotation) or another suitable period. Disabling combustion within the engine 102 slows the engine speed 264.

If the engine speed 264 is less than a second predetermined speed after the second predetermined period, the cylinder control module 512 may command the valve control module 240 to re-activate one cylinder such that the fresh air charge is expelled from the one cylinder. The cylinder control module 512 may also command the fuel control module 236 to provide fuel to the one cylinder and command the spark control module 232 to provide spark to the one cylinder after the fresh air charge is expelled. The cylinder control module 512 may selectively re-activate the cylinders and begin providing the cylinders with fuel and spark one at a time until all of the cylinders are re-activated. The second predetermined speed is less than the first predetermined speed and may be, for example, approximately 6500 RPM or another suitable speed. If the engine speed 264 is greater than the second predetermined speed but less than the first predetermined speed, the cylinder control module 512 may command the valve control module 240 to deactivate all of the cylinders if one or more of the cylinders have been re-activated.

If the engine speed is not less than the second predetermined speed after the second predetermined period, the cylinder control module 512 may selectively command the valve control module 240 to perform engine braking. For example only, the cylinder control module 512 may command the valve control module 240 to perform engine braking when the engine speed 264 is greater than a third predetermined speed. The third predetermined speed is greater than the first predetermined speed (and therefore greater than the second predetermined speed). For example only, the third predetermined speed may be approximately 7250 RPM or another suitable speed.

The cylinder control module 512 may command the valve control module 240 to perform engine braking using exhaust valve opening. For example only, the cylinder control module 512 may command the valve control module 240 to control valve actuation such that each of the exhaust valves is opened with a predetermined amount of lift. The predetermined amount of lift may be, for example, approximately 1 millimeter (mm) of lift, less than 1 mm, or another suitable amount of lift. The predetermined amount of lift may be set, for example, to prevent the exhaust valves from ever contacting a piston.

For another example only, the cylinder control module 512 may command the valve control module 240 control valve opening such that each exhaust valve of a cylinder opens when the piston of the cylinder is moving toward the BDC position and closes when the piston is moving toward the TDC position. The cylinder control module 512 may command the valve control module 240 to control the exhaust valves of the other cylinders similarly or identically.

Figure 6:
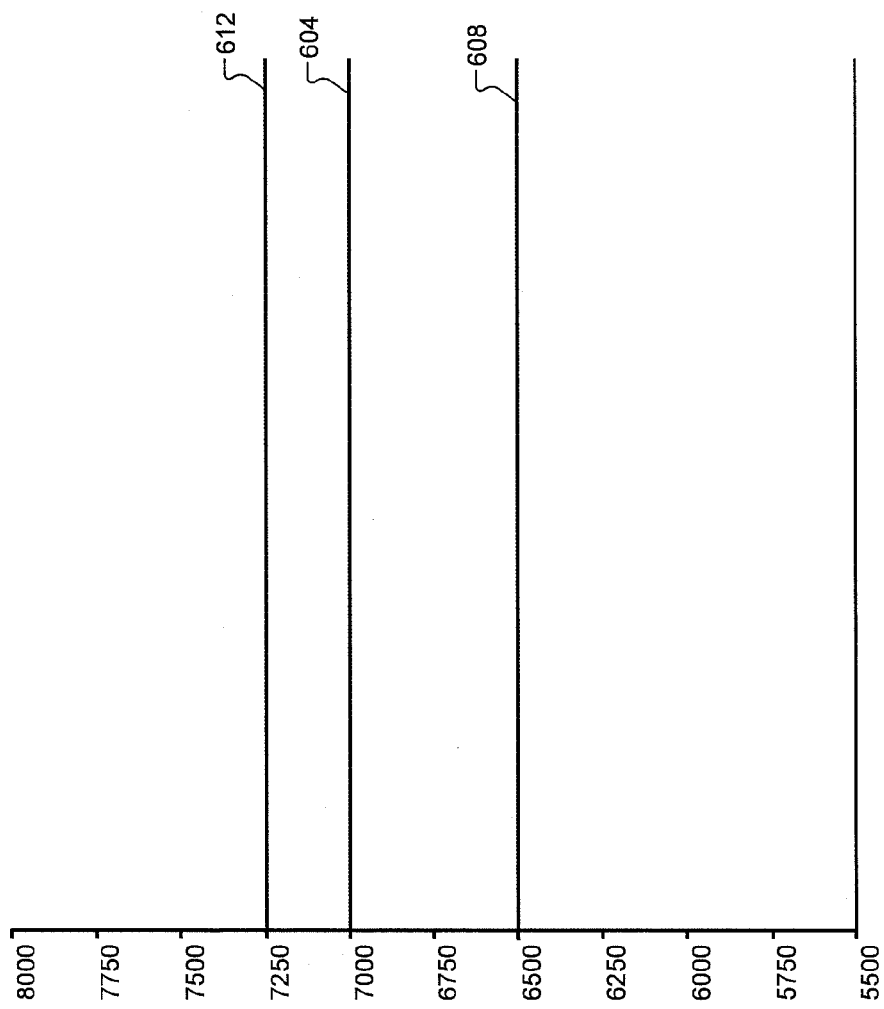
FIG. 6 is an illustration of example engine speeds that can be used in controlling valve actuation according to the present disclosure.

FIG. 6 includes an example illustration of the relationship between the first, second, and third predetermined speeds. The first predetermined speed is illustrated by 604. The second predetermined speed is illustrated by 608, and the third predetermined speed is illustrated by 612.

Figure 7:
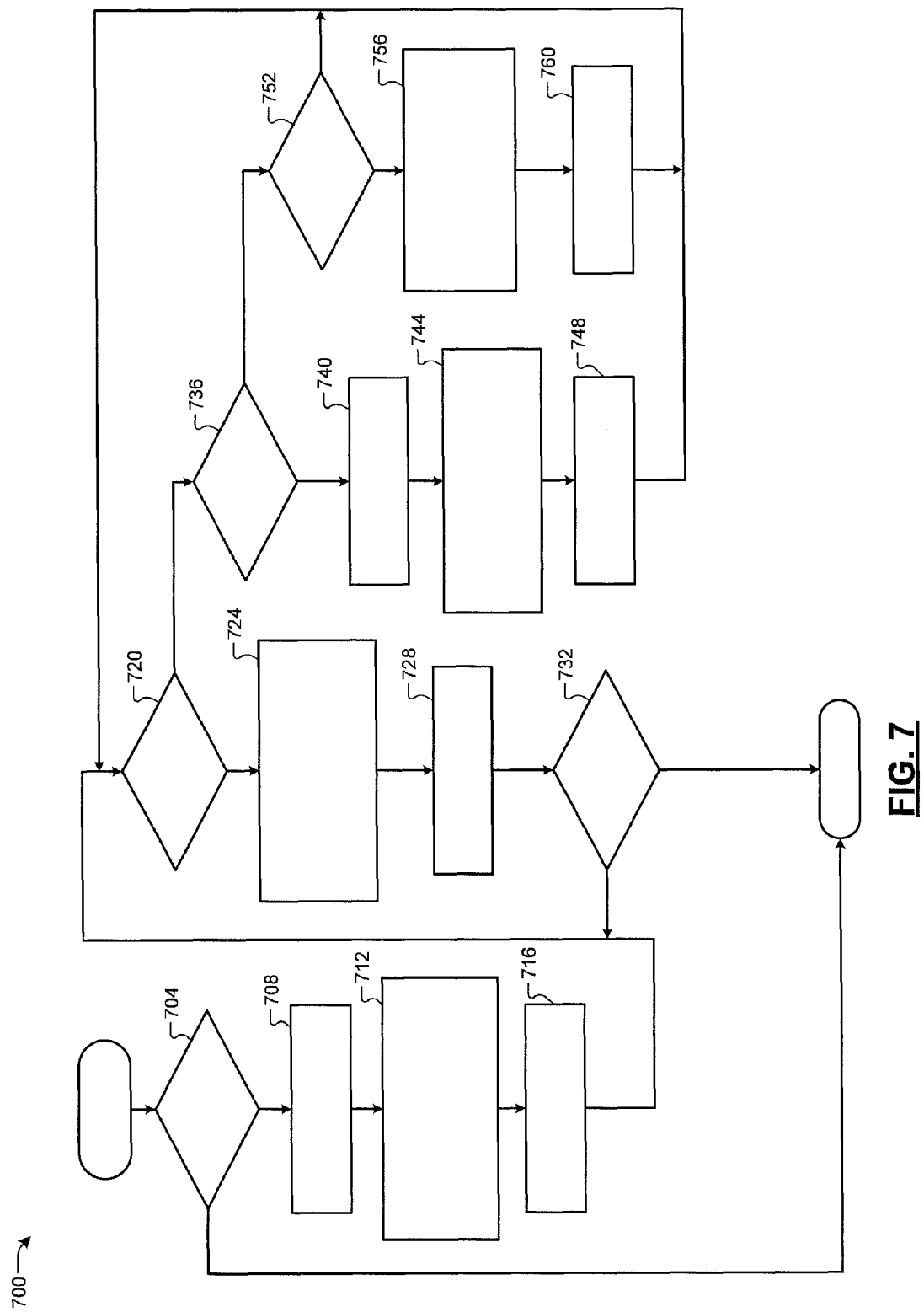
FIG. 7 is a flowchart of an example method of controlling valve actuation based on engine speed according to the principles of the present disclosure.

Referring now to FIG. 7, a flowchart depicting an example method 700 of controlling valve actuation based on the engine speed 264 is presented. Control may begin at 704 where control determines whether the engine speed 264 is greater than the first predetermined speed 604. If true, control continues with 708; if false, control may end. For example only, the first predetermined speed 604 may be approximately 7000 RPM.

At 708, control cuts off fuel to all of the cylinders of the engine 102. Control may also disable spark to all of the cylinders at 708. At 712, control deactivates all of the cylinders of the engine 102 such that a fresh air charge is trapped within each of the cylinders of the engine 102. Control traps a fresh air charge within a cylinder by deactivating the valves of the cylinder after the intake valve is closed for a given combustion cycle of the cylinder. Control waits for the second predetermined period at 716. For example only, the second predetermined period 716 may be one combustion cycle or another suitable period.

Control determines whether the engine speed 264 is less than the second predetermined speed 608 at 720. If true, control may continue with 724; if false, control may continue with 736, which is discussed further below. The second predetermined speed 608 is less than the first predetermined speed 604. For example only, the second predetermined speed 608 may be approximately 6500 RPM.

At 724, control commands one cylinder of the de-activated cylinders to be re-activated such that the fresh air charge is expelled from the one cylinder. Control may also command fuel and spark to be provided to the one cylinder at 724. Control waits for a third predetermined period at 728. The third predetermined period may be set such that control ramps up torque production capacity slowly enough to prevent a significant increase in the engine speed 264 and/or engine torque as the cylinders are re-activated. For example only, the third predetermined period may be approximately two combustion cycles or another suitable period. Control determines whether one or more cylinders are still deactivated at 732. If true, control may return to 720; if false, control may end. While control is shown and described as ending, the example of FIG. 7 is illustrative of one control loop and control may return to 704.

Referring back to 736 (when the engine speed 264 is not less than the second predetermined speed 608 at 720), control determines whether the engine speed 264 is greater than the third predetermined engine speed 612. If true, control continues with 740; if false, control transfers to 752, which is discussed further below. The third predetermined speed 612 is greater than the first predetermined speed 604. For example only, the third predetermined speed 612 may be approximately 7250 RPM.

At 740, control cuts off fuel to all of the cylinders of the engine 102. Control may also disable spark to all of the cylinders at 740. At 744, control performs engine braking using exhaust valve opening. For example only, control may command all of the exhaust valves to be opened based on the predetermined amount of lift at 744. For another example only, control may include opening the exhaust valves as the pistons are moving toward the TDC positions and opening the exhaust valves as the pistons are moving toward the BDC positions.

At 748, control waits for a fourth predetermined period before returning to 720. The fourth predetermined period may be the same as or different than the second predetermined period. For example only, the fourth predetermined period may be one combustion cycle or another suitable period.

Referring back to 752 (when the engine speed 264 is not greater than the third predetermined speed 612 at 736), control may determine whether the engine speed 264 is less than the first predetermined speed 604. If true, control may continue with 756; if false, control may return to 720. At 756, control may deactivate all of the cylinders, and control may wait a fifth predetermined period at 760 before returning to 720. The fifth predetermined period may be the same as or different than the second predetermined period. For example only, the fifth predetermined period may be one combustion cycle or another suitable period.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a trigger module that generates a trigger when an engine speed is greater than a first predetermined speed, wherein the first predetermined speed is greater than zero;
a fuel control module that cuts off fuel to cylinders of the engine in response to the generation of the trigger; and
a cylinder control module that selectively disables opening of intake and exhaust valves of the cylinders in response to the generation of the trigger after the fuel is cut off.

2. The system of claim 1 wherein the cylinder control module disables opening of the intake and exhaust valves of one of the cylinders starting at a time between an intake stroke of a combustion cycle of the one of the cylinders and an exhaust stroke of the combustion cycle of the one of the cylinders.

3. The system of claim 1 wherein the cylinder control module enables opening of the intake and exhaust valves of a first one of the cylinders when the engine speed is less than a second predetermined speed, and
wherein the second predetermined speed is less than the first predetermined speed.

4. The system of claim 3 wherein the cylinder control module enables opening of the intake and exhaust valves of the first one of the cylinders starting at a time between an intake stroke of a first combustion cycle of the first one of the cylinders and an exhaust stroke of the first combustion cycle of the first one of the cylinders.

5. The system of claim 4 wherein the fuel control module starts providing fuel to the cylinder during a second combustion cycle that follows the first combustion cycle.

6. The system of claim 3 wherein, at least a predetermined period after opening of the intake and exhaust valves of the first one of the cylinders is enabled, enables the intake and exhaust valves of a second one of the cylinders when the engine speed is less than the second predetermined speed.

7. The system of claim 6 wherein the predetermined period is at least two combustion cycles.

8. The system of claim 3 wherein, at least a predetermined period after opening of the intake and exhaust valves of the first one of the cylinders is enabled, the fuel control module cuts off fuel to the engine when the engine speed is greater than a third predetermined speed, and
wherein the third predetermined speed is greater than the first predetermined speed.

9. The system of claim 8 wherein the cylinder control module enables opening of the exhaust valves of the cylinders based on a predetermined lift when the engine speed is greater than the third predetermined speed.

10. The system of claim 8 wherein, when the engine speed is greater than the third predetermined speed, the cylinder control module enables opening of an exhaust valve of a second one of the cylinders when a volume within the second one of the cylinders is increasing and disables opening of the exhaust valve when the volume within the second one of the cylinders is decreasing.

11. A method for a vehicle, comprising:
generating a trigger when an engine speed is greater than a first predetermined speed,
wherein the first predetermined speed is greater than zero;
cutting off fuel to cylinders of the engine in response to the generation of the trigger; and
selectively disabling opening of intake and exhaust valves of the cylinders in response to the generation of the trigger after the fuel is cut off.

12. The method of claim 11 further comprising disabling opening of the intake and exhaust valves of one of the cylinders starting at a time between an intake stroke of a combustion cycle of the one of the cylinders and an exhaust stroke of the combustion cycle of the one of the cylinders.

13. The method of claim 11 further comprising enabling opening of the intake and exhaust valves of a first one of the cylinders when the engine speed is less than a second predetermined speed,
wherein the second predetermined speed is less than the first predetermined speed.

14. The method of claim 13 further comprising enabling opening of the intake and exhaust valves of the first one of the cylinders starting at a time between an intake stroke of a first combustion cycle of the first one of the cylinders and an exhaust stroke of the first combustion cycle of the first one of the cylinders.

15. The method of claim 14 further comprising starting providing fuel to the cylinder during a second combustion cycle that follows the first combustion cycle.

16. The method of claim 13 further comprising, at least a predetermined period after opening of the intake and exhaust valves of the first one of the cylinders is enabled, enabling the intake and exhaust valves of a second one of the cylinders when the engine speed is less than the second predetermined speed.

17. The method of claim 16 wherein the predetermined period is at least two combustion cycles.

18. The method of claim 13 further comprising, at least a predetermined period after opening of the intake and exhaust valves of the first one of the cylinders is enabled, cutting off fuel to the engine when the engine speed is greater than a third predetermined speed,
wherein the third predetermined speed is greater than the first predetermined speed.

19. The method of claim 18 further comprising enabling opening of the exhaust valves of the cylinders based on a predetermined lift when the engine speed is greater than the third predetermined speed.

20. The method of claim 18 further comprising, when the engine speed is greater than the third predetermined speed:
enabling opening of an exhaust valve of a second one of the cylinders when a volume within the second one of the cylinders is increasing; and
disabling opening of the exhaust valve when the volume within the second one of the cylinders is decreasing.

* * * * *